United States Patent [19]
Larkin

[11] 3,993,879
[45] Nov. 23, 1976

[54] ACOUSTICAL COMMUNICATIONS HEADSET
[76] Inventor: Wallace Keith Larkin, 360 Hidden Valley Road, Soquel, Calif. 95073
[22] Filed: Mar. 24, 1975
[21] Appl. No.: 561,473

[52] U.S. Cl. ............................... 179/156 A; 181/20
[51] Int. Cl.² .................... H04M 1/05; G10K 11/12
[58] Field of Search .................... 179/156 A, 1 PC; 181/18, 20, 22

[56] References Cited
UNITED STATES PATENTS

| | | | |
|---|---|---|---|
| 1,541,121 | 6/1925 | Doble | 179/29 |
| 1,615,974 | 2/1927 | Cooper | 179/29 |
| 3,610,830 | 10/1971 | Daleiden et al. | 179/1 SW |
| 3,671,685 | 6/1972 | McCabe | 179/1 G |
| 3,693,748 | 9/1972 | Jones et al. | 181/20 |
| 3,781,492 | 12/1973 | Cragg et al. | 179/156 A |

Primary Examiner—William C. Cooper
Attorney, Agent, or Firm—Limbach, Limbach & Sutton

[57] ABSTRACT

The detachable communications headset described herein is all acoustic, comprising support means for coupling a mouthpiece tube to a transmitter tube and a receiver tube to an ear tube and for supporting the headset on the user's head. All electronic components necessary for radio and telephone communications are remote from the user's head.

12 Claims, 2 Drawing Figures

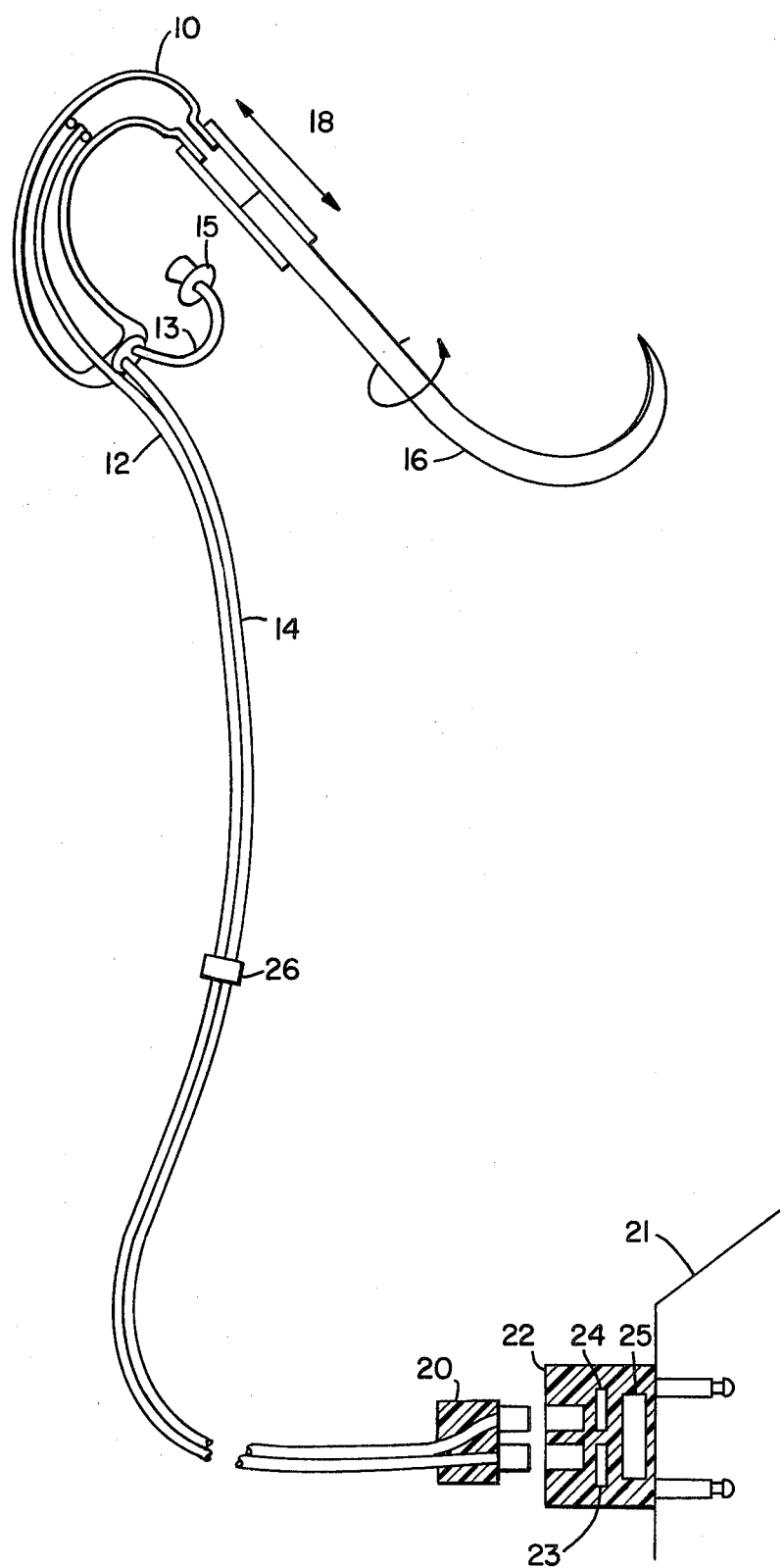
FIG _ 1

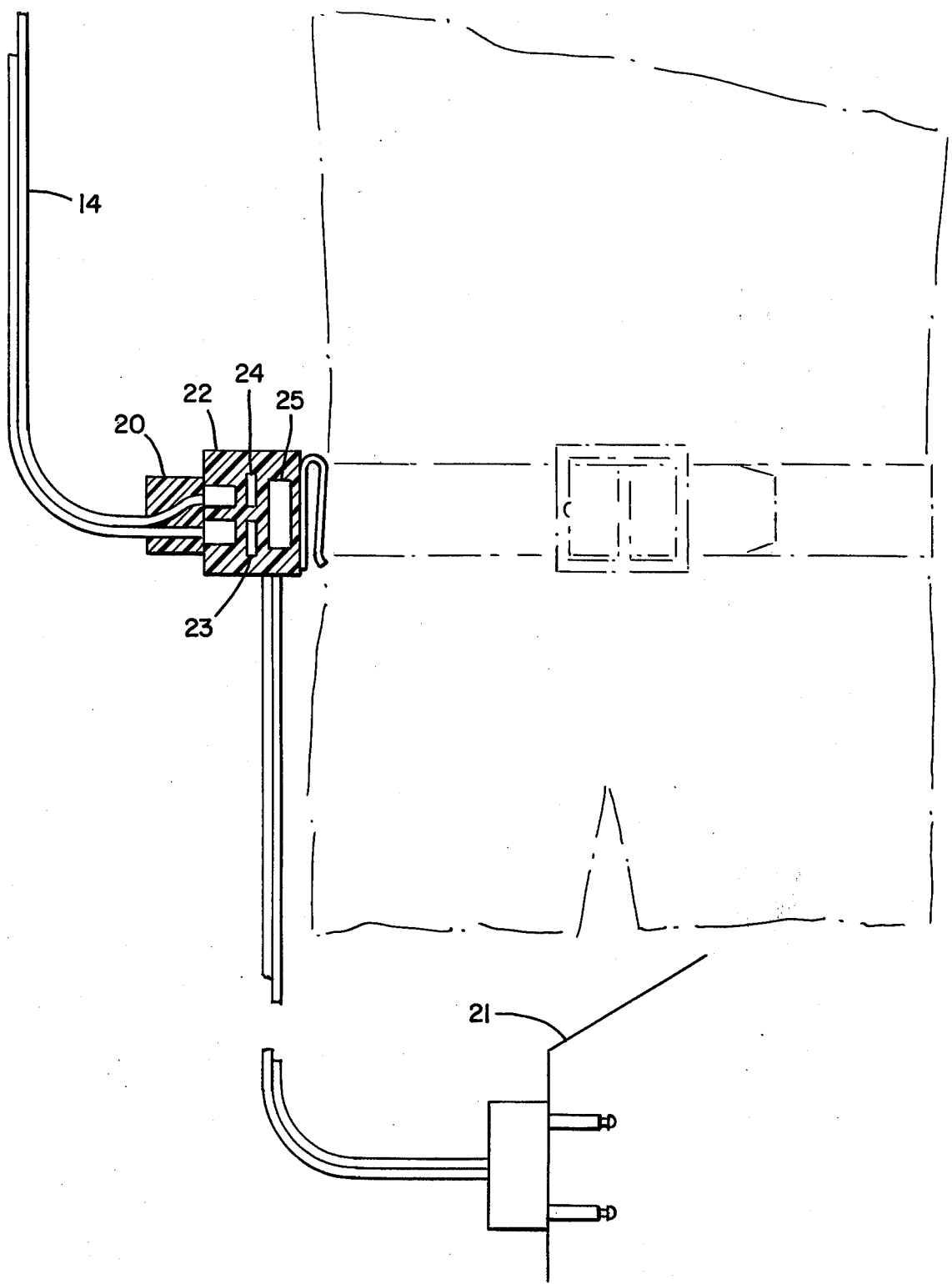
FIG_2

ACOUSTICAL COMMUNICATIONS HEADSET

BACKGROUND OF THE INVENTION

Prior art radio and telephone communication headsets typically incorporate a microphone and receiver which require amplifier or other appropriate electronic impedance matching circuits for interface with the console, or at least electrically conductive wires to similar electronic circuitry located in the console. These devices have been substantially miniaturized in recent years, one such device being described in U.S. Pat. No. 3,184,556 entitled "Miniature Headset-Microphone Adapted for Use with a Mask," issued May 18, 1965 to the inventor hereof. However, even as miniaturization has improved user comfort by reducing weight, initial cost is high. Owing to the relative fragility of their component parts ruggedized construction is required, which also adds to cost, and replacement or repair of these headsets is frequent and expensive. Stability and comfort have remained factors for improvement, as size and configuration of conventional headsets are determined by the dimensions of integrally mounted electronic components. In addition, the electrically conductive wires create a hazard to the user in that those wires can conduct high voltage transients, often present in and around communication systems, to the user's head.

SUMMARY OF THE INVENTION

A headset constructed according to the principles of the present invention comprises support means, constructed of lightweight material for wearing on the user's head and for coupling a mouthpiece tube to a transmitter tube, and a receiver tube to an ear tube. The support means may be shaped as a post auricle mount, or include means for mounting to eyeglasses temple or conventional headband. The ear, transmitter, and receiver tubes, approximately one-fourth inch in outside diameter (OD) and one-eighth inch inside diameter (ID), are constructed of lightweight flexible material and are long enough to reach from the user's head near one ear to the communications console being operated. The mouthpiece tube having approximately the same ID and OD as the other tubes, is molded to predetermined shape for adjustable positioning near the user's mouth. The transmitter and receiver tubes terminate in a plastic plug which mates with the female console receptacles generally available on conventional telephone and radio communications equipment for headset attachment, either directly or via a detachable jack case containing the electronic components such as microphone, receiver and related amplifiers. In another embodiment of this invention, the microphone, receiver and related amplifiers are housed in a small detachable case having means for wearing on the user's belt or lapel or in his shirt or coat pocket, and electrically conductive wires detachably connect these components to the console via a jack.

The preferred embodiment of the present invention is entirely passive, including no active electronic components and is thereby inherently insensitive to harsh use and shock. Moreover, if the headset is damaged or lost, it may be replaced at low cost without replacing the detachable case containing expensive electronic components. Packaging of electronics in the detachable case not only eliminates the electrical wires running to the user's head, but also allows use of larger, lower cost electrical components. By using a larger, lower cost microphone, for example, it may even be possible to eliminate some electronic circuitry. Of course, necessary components could also be built-in as an integral part of the console. The headset of the present invention offers low cost, small-size, lightweight, balanced and ruggedized design and construction.

DESCRIPTION OF THE DRAWING

FIG. 1 of the drawing shows a headset constructed according to the preferred embodiment of the present invention including cross-sectional view of post auricle mount.

FIG. 2 illustrates an alternative embodiment.

DESCRIPTION OF THE PREFERRED EMBODIMENT

Referring to FIG. 1, the preferred embodiment of the present invention comprises hollow post auricle mount 10 coupled to transmitter, ear and receiver tubes 12, 13 and 14, respectively, by compression fit or other suitable means and to mouthpiece tube 16 via hollow adjustment means 18. Adjustment means 18 may be constructed of any essentially inflexible material such as hard plastic or aluminum. Transmitter tube 12, ear tube 13 and receiver tube 14 are polyvinylchloride (PVC) tubing in this embodiment, but may be of any other acoustically similar material. All of these tubes are approximately one-fourth inch OD and one-eighth inch ID. Ear tube 13 terminates in the user's ear via earpiece 15 which is constructed of a soft pliable material for maximum user comfort such as PVC. Both receiver and transmitter tubes are long enough to terminate at plug 20 (up to approximately 4 feet) which connects to communications console 21 through detachable jack 22 containing necessary electronic components such as microphone 23, receiver 24 and amplifier 25. Jack 22 is a molded plastic case designed to fit female receptacles generally used on conventional telephone and radio communications equipment for headset attachment. Of course, the electronic components contained in jack 22 could ultimately be incorporated into console 21, thus eliminating jack 22 from the system.

In another embodiment of this invention, microphone 23, receiver 24 and amplifier 25 are housed in a small molded plastic case having a clip for attaching to the user's belt or lapel. The case can also be placed in the user's shirt or other pocket if more convenient. In this embodiment, plug 20 connects to the case and jack 22 is reduced to conventional size for receiving electrically conductive wires from the components in the case.

Mount 10, which is constructed of molded high impact resistant styrene, PVC or similar material, is contoured and balanced for comfortable fit around either of the user's ears. Ear tube 13 conducts sound to the user's ear when received via mount 10 from receiver tube 14, which conducts sound from the console to the mount 10. Receiver tube 14 is molded or otherwise joined to transmitter tube 12 along its length to plug 20. Thus only one lightweight sound conducting assembly is suspended from the user's ear. Both tubes, particularly transmitter tube 12, may be sound insulated along their length beginning at clip 26 to plug 20 with a sound insulating material such as soft polyurethane foam or other suitable material. Clip 26, similar to a conventional tie clasp, is used to clip tubes 12 and 14 to the user's clothing (for example, a lapel) at a convenient location so the user may move his head freely without pulling at the entire length of tubes 12 and 14. The headset thereby tends to remain stable on the user's head, even as he moves his head, without the discomfort of a headband or other straps. If preferred, however, mount 10 could be provided with means for attachment to a headband or the temple of eyeglasses such as that shown in the above-referenced U.S. Patent. By using uninsulated tubing for the portion of tubes 12 and 14 between the user's ear and clip 26, greater user comfort is achieved, since less mass must be moved by the user's head as it moves.

It should be noted that sound insulation of tubes 12 and 14 may not be necessary in the configuration wherein the electronic components are packaged in the small case worn on the user's belt or lapel or in his pocket, since the electrical conductive wires require no such insulation and tubes 12 and 14 are much shorter.

Transmitter tube 12 conducts sound from mount 10 when received through mouthpiece tube 16 and adjustment means 18. Adjustment means 18 may be of any suitable design to accommodate the head shape and size of different users by adjusting the length of tube 16 from mouth to ear and allowing comfortable positioning of the open end of the tube near the corner of the user's mouth.

FIG. 2 illustrates an alternative embodiment in which the acoustic tubes are attached to plug 20 inserted in jack 22 which is mounted on the wearer's body. In the embodiment illustrated, jack 22 is mounted on the belt by means of a clip, but it may conveniently be clipped to a sleeve, lapel or other location on the wearer's body separate from the head. Jack 22 is electrically connected to console 21 by means of wires and a plug.

I claim:

1. An acoustical communications headset for use with communications equipment, said headset comprising:
    a transmitter tube having one end detachably coupled to the communications equipment for conducting sound thereto and the other end terminating in a mouthpiece tube positioned near the user's mouth for conducting sound therefrom;
    a receiver tube detachably coupled at one end to the communications equipment for conducting sound therefrom and at the other end terminating in an ear tube positioned in the user's ear for conducting sound thereto; and
    head mounted support means for supporting the other ends of the transmitter, mouthpiece, receiver and ear tubes, respectively, adjacent the user's ear and for conducting sound from the mouthpiece tube to the transmitter tube and from the receiver tube to the ear tube.

2. An acoustical communications headset as in claim 1 further including coupling means for coupling a microphone to the transmitting tube and a receiver to the receiver tube, and for detachably coupling the transmitter and receiver tubes to a communications console.

3. An acoustical communications headset as in claim 2 wherein the coupling means also contains a microphone, a receiver and electric circuit means to connect the microphone and receiver to a communications console.

4. An acoustical communications headset as in claim 1 further including adjustment means for adjustably coupling the mouthpiece tube to the support means to position one end adjacent the user's mouth.

5. An acoustical communications headset as in claim 1 wherein the transmitter, receiver and ear tubes are constructed of flexible and resilient plastic material.

6. An acoustical communications headset as in claim 5 wherein the transmitter, receiver and ear tubes are constructed of polyvinylchloride plastic material.

7. An acoustical communications headset as in claim 1 wherein the support means and mouthpiece tube are constructed of high impact resistant plastic material and contoured to fit around the user's ear.

8. An acoustical communications headset as in claim 7 wherein the support means and mouthpiece tube is constructed of polyvinylchloride plastic material.

9. An acoustical communications headset as in claim 7 wherein the support means is a post auricle mount.

10. An acoustical communications headset as in claim 3 wherein the coupling means is constructed of high impact resistant plastic material.

11. An acoustical communications headset as in claim 3 wherein the coupling means is rigidly connected to the console.

12. An acoustical communications headset as in claim 3 wherein the coupling means is worn on the user's body.

* * * * *